United States Patent [19]
Nakai et al.

[11] Patent Number: 5,638,536
[45] Date of Patent: Jun. 10, 1997

[54] SIGNAL PROCESSING APPARATUS CAPABLE OF COMPUTING REPLACEMENT DATA SUBSTITUTED FOR SET DATA

[75] Inventors: Tomomichi Nakai, Ogaki; Toshio Nakakuki, Gifu-ken, both of Japan

[73] Assignee: Sanyo Electric Co., Ltd., Osaka, Japan

[21] Appl. No.: 450,725

[22] Filed: May 26, 1995

[30] Foreign Application Priority Data

May 31, 1994 [JP] Japan .................................. 6-118459

[51] Int. Cl.⁶ .................................................. G06F 13/00
[52] U.S. Cl. ......................... 395/493; 395/427; 395/481; 358/909.1; 364/DIG. 1
[58] Field of Search ................................. 395/427, 493, 395/481, 182.01, 909.1

[56] References Cited

U.S. PATENT DOCUMENTS

| | | | |
|---|---|---|---|
| 4,392,159 | 7/1983 | Lemoine et al. | 358/319 |
| 4,644,349 | 2/1987 | Fujita et al. | 340/825.25 |
| 4,727,426 | 2/1988 | Itabashi et al. | 348/725 |
| 4,731,654 | 3/1988 | Itabashi et al. | 348/725 |
| 5,142,537 | 8/1992 | Kutner et al. | 371/31 |
| 5,446,456 | 8/1995 | Seo | 341/118 |

Primary Examiner—Frank J. Asta
Attorney, Agent, or Firm—Loeb & Loeb LLP

[57] ABSTRACT

A plurality of setting data stored in a serial register 11 and externally supplied replacement data are inputted into selectors 12. Either of the setting or replacement data is provided to the respective one of the setting inputs $S_1$–$S_n$ in a digital signal processing unit 10. Each of the selectors 12 usually selects the setting data. When a selector 12 is specified by a decoder 13 based on address data, it only selects the replacement data. When the replacement and address data are suitably set, the computation condition of the digital signal processing unit 10 can be partially changed without rewriting of the setting data in the serial register 11.

6 Claims, 3 Drawing Sheets

SIGNAL PROCESSING APPARATUS CAPABLE OF COMPUTING REPLACEMENT DATA SUBSTITUTED FOR SET DATA

BACKGROUND OF THE INVENTION

1. Field of the Invention

The present invention relates to a signal processing apparatus for applying various kinds of processing to digital data.

2. Description of the Prior Art

In conventional cameras using CCD (Charge Coupled Device) image sensors, the output of the image sensor is subjected to gamma correction, edge correction and so on. With a color camera, particularly, the image sensor output is also subjected to white balance regulation, high-bright pseudo signal suppression and so on. Thus, the color camera will have many items to be processed. In such a signal processing circuit, the setting of signal processing condition is easier and the signals are less degraded. Therefore, the signal processing mode tends to be shifted from the analog mode to the digital mode.

FIG. 1 is a block diagram of a camera having a digital processing mode.

CCD image sensor 1 has a plurality of light receiving pixels disposed in a matrix. The light receiving pixels accumulate information charges produced in response to the incident light. CCD driver 2 supplies a multi-phase transfer clock to the image sensor 1 and causes the respective light receiving pixels to transfer the charges accumulated therein for forming an image signal $Y_{1(t)}$. An analog signal processing unit 3 executes sample and hold, automatic gain control (AGC), and other processes relative to the image signal $Y_{1(t)}$, to form an output image signal $Y_{2(t)}$. The image signal $Y_{2(t)}$ is then converted into digital data by an A/D converting circuit 4 to generate image data $D_{1(t)}$ which is in turn inputted into a digital signal processing unit 5. The digital signal processing unit 5 applies gamma correction and reference level clamp and, particularly with the color camera, also executes white balance regulation, high-bright pseudo signal suppression and so on, to generate image data $D_{2(t)}$. The image data $D_{2(t)}$ is then converted into analog values, to generate an image output signal $Y_{3(t)}$, by a D/A converter 6.

The analog and digital signal processing units 3, 5 respectively receive control commands for setting the condition of signal processing. For example, the analog signal processing unit 3 may receive, as a voltage value, a reference voltage used to perform the sample and hold of the image signal $Y_{1(t)}$ or a reference voltage used to carry out the automatic gain control. On the other hand, the digital signal processing unit 5 may receive the information of adjustment for gamma correction coefficient and white balance regulation in the form of digital data that comprises an appropriate number of bits.

If the digital signal processing unit 5 receiving the control command in the form of digital data is to be composed of an integrated circuit, it is connected to a serial register 7, as shown in FIG. 2. First of all, a plurality of setting data are sequentially inputted and stored in the serial register 7 to set the operational conditions of the digital signal processing unit 5. The serial register 7 then provides the setting data to the setting inputs $S_1$–$S_n$ of the digital signal processing unit 5 at the same time. Thus, even if only a single input pin is used to input the setting data, a plurality of control data can be supplied to the digital signal processing unit 5 through the serial register 7.

Thus, the total number of bits in all the setting data required by the digital signal processing unit 5 will be continuously inputted and stored in the serial register 7. Even if it is desired to change only a part of the setting data, therefore, all the setting data must be newly received by the serial register 7. This necessarily requires peripheral equipment for inputting the setting data into the serial register 7, resulting in an increase in the manufacturing cost. As color image signals require more setting conditions, the setting data to be written into the serial register 7 is also increased. This raises a problem in that the setting data are to be rewritten in the serial register 7. In this regend, the serial register 7 may be a shift register for transferring the data in synchronism with the serial transfer clock of the setting data.

SUMMARY OF THE INVENTION

It is therefore an object of the present invention to provide a signal processing apparatus which can easily change part of the setting data and which can prevent its manufacturing cost from increasing.

According to the present invention, the signal processing apparatus comprises a replacement unit located in a path through which setting data is provided from a register to a digital signal processing unit which uses the setting data to process signals. The replacement unit can substitute replacement data for the setting data. Therefore, the setting data can be partially changed without rewriting of the setting data which have been stored in the register.

The replacement unit may be comprised of a selector for selecting one of a plurality of supplied signals. Alternatively, the replacement unit may be made up of a plurality of selectors, one of which is controllably selected by a decoded address data signal to replace desired setting data, among a plurality of setting data, with replacement data.

DETAILED DESCRIPTION OF THE PREFERRED EMBODIMENTS

Figure 1:
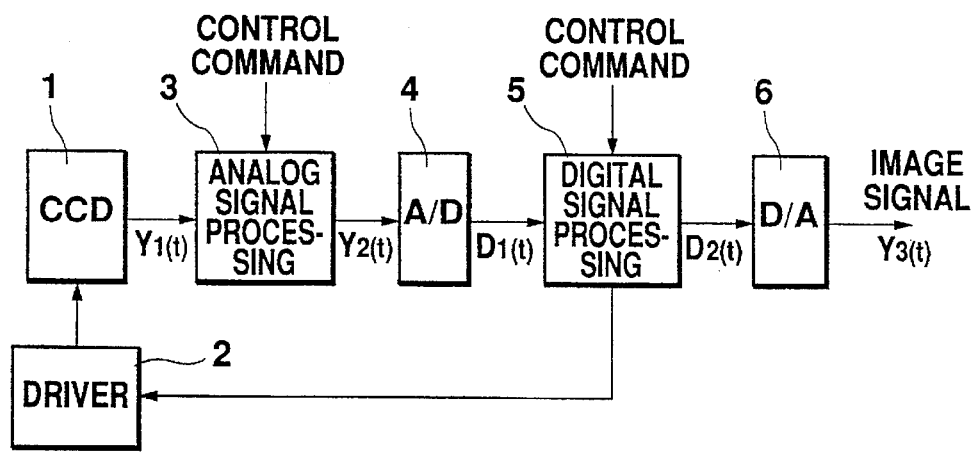
FIG. 1 is a block diagram of a solid-state camera according to the prior art.
Figure 2:
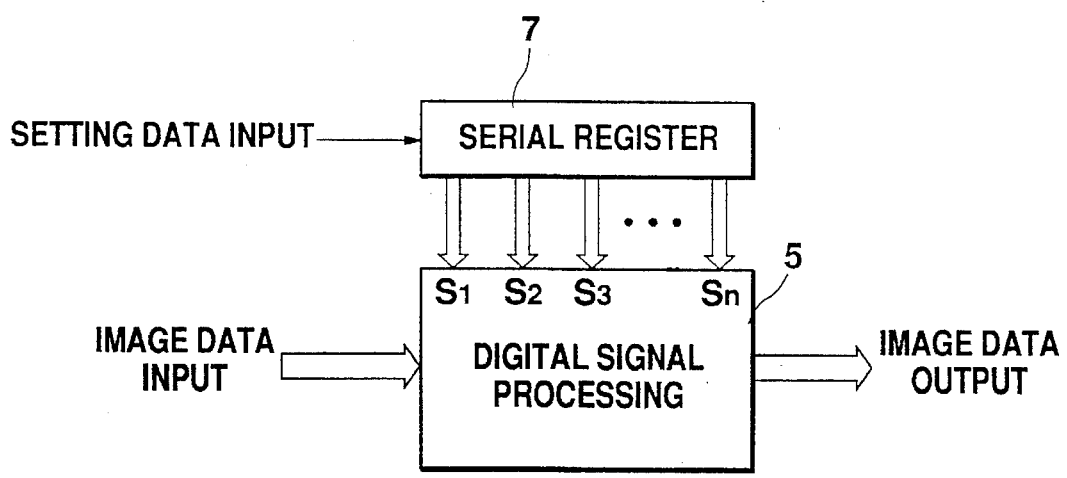
FIG. 2 is a block diagram of a signal processing apparatus according to the prior art.
Figure 3:
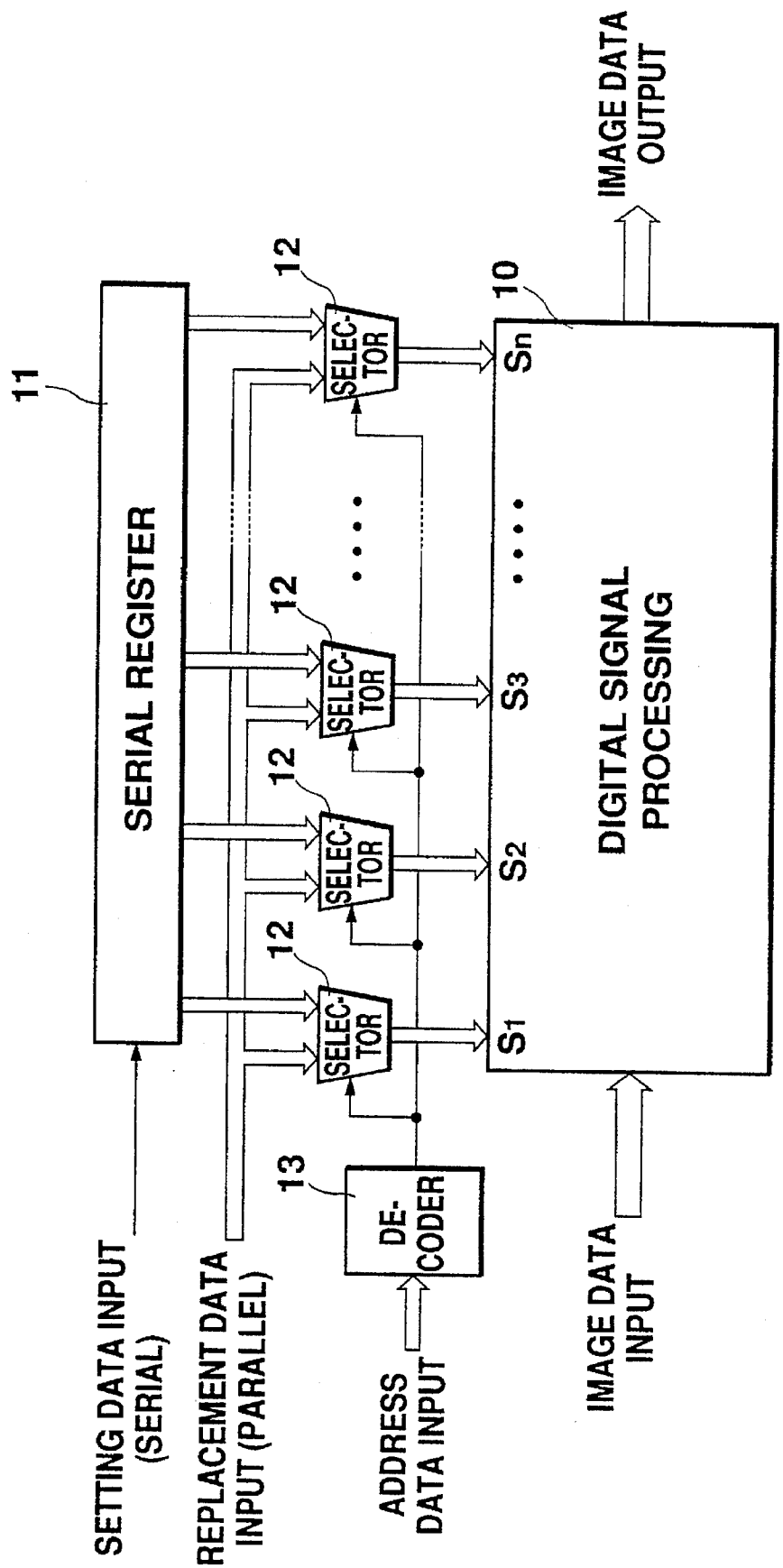
FIG. 3 is a block diagram of a signal processing apparatus according to the present invention.

Referring now to FIG. 3, there is shown a signal processing apparatus according to the present invention which comprises a digital signal processing unit 10 for executing various types of computation to input image data and for outputting image data subjected to gamma correction, white balance regulation and so on. The digital signal processing unit 10 may be of the same structure and execute the same procedure as in the digital signal processing unit 5 of FIG. 1. The signal processing apparatus also comprises a serial register 11 which continuously receives and stores a plurality of setting data required by the digital signal processing unit 10 and simultaneously outputs the stored setting data at a predetermined timing. The signal processing apparatus further comprises a plurality of selectors 12 equal to the number of setting data connected in rows to the respective outputs of the serial register 11. Each of the selectors 12 selects either of the setting data from the serial register 11 or the replacement data from the exterior and then provides it to the corresponding one of the setting inputs $S_1$-$S_n$ in the digital signal processing unit 10. The replacement data inputted into each of the selectors 12 is data that has the same number of bits as the setting data and that is common to all the selectors 12 and generated by a peripheral circuit externally connected to the signal processing apparatus. The signal processing apparatus further comprises a decoder 13 which is responsive to an input address data to select and switch one of the selectors 12 to the side of replacement data. The address data inputted into the decoder 13 is also generated by the peripheral circuit with the replacement data. The address data is data that has the number of bits equal to the number of selectors 12. For example, if only one bit is set to "1", the decoder 13 then provides a switching signal to a selector 12 corresponding to the location of the address data "1".

If such a signal processing apparatus is to be formed by an integrated circuit, the signal processing apparatus has input terminals equal in number to the number of bits in the respective data to perform the parallel input of the replacement and address data. Each of the input terminals is connected to either of the power supply or ground potential. Thus, the replacement and address data are respectively provided to the selectors 12 and decoder 13 as fixed data. If the replacement data is of eight bits, eight input terminals are formed in the signal processing apparatus. These input terminals are connected to the power supply or ground potential to set the replacement data having a predetermined value.

For example, each of the setting data stored in the serial register 11 may be used to set the computation in the digital signal processing unit 10 at a standard condition. The replacement data provided to each of the selectors 12 may be used to set part of the computation at a special condition. When a particular computation condition is to be changed, an address data for specifying one of the selectors 12 to be connected to one of the setting inputs $S_1$-$S_n$ that corresponds to the computation condition to be changed will be provided to the decoder 13. Thus, the setting data which is inputted into that selector 12 specified by the address data input to the decoder 13 is replaced by the replacement data which is in turn provided to a particular one of the setting inputs $S_1$-$S_n$. Therefore, the computation condition in the digital signal processing unit 10 can be partially changed without rewriting of the setting data in the serial register 11.

The setting and replacement data should be repeatedly used to perform the computation in the digital signal processing unit 10. During the computation, therefore, the data may be supplied to the setting inputs $S_1$-$S_n$ at all times.

Figure 4:
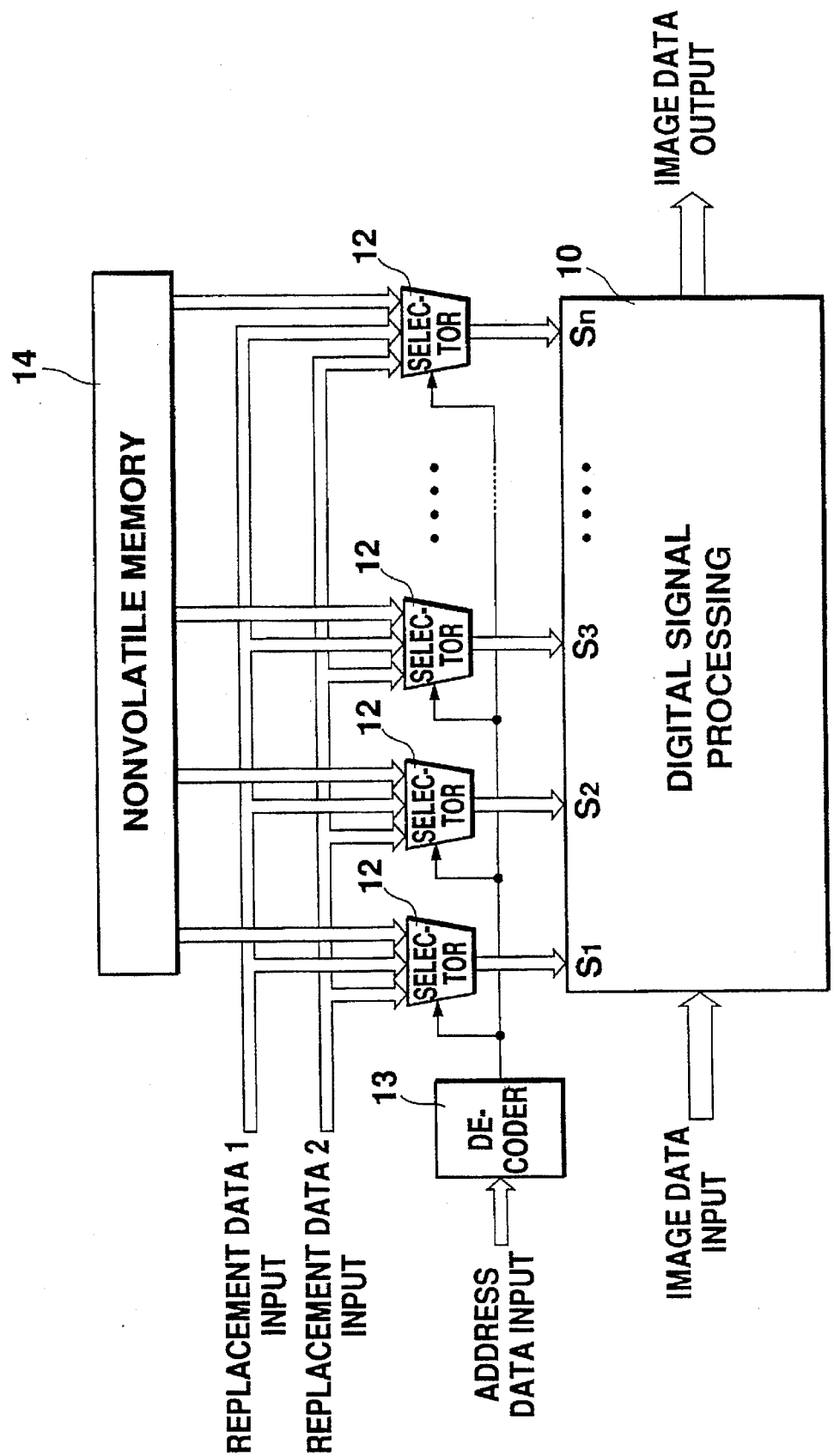
FIG. 4 is a block diagram of another signal processing apparatus according to the present invention.

However, the serial register 11 storing the setting data is not necessarily required to receive the setting data in a serial manner. The serial register 11 may be replaced by a read only memory or nonvolatile memory that have the setting data stored therein. In such a case, the peripheral circuit externally attached to the signal processing apparatus does not require any circuit for generating the setting data if the setting data have been stored in the serial register 11 when manufacturing the signal processing apparatus. Such an arrangement is shown in FIG. 4.

In the embodiment of FIG. 3, the decoder 13 selects one of the selectors 12 to provide the replacement data to the corresponding one of the setting inputs $S_1$-$S_n$. In the embodiment of FIG. 4, however, the decoder 13 specifies two selectors 12 to provide the replacement data to the corresponding two of the setting inputs $S_1$-$S_n$. In such a case, since one setting data is replaced by one of the plural replacement data, each of the selectors 12 selects one of the setting and replacement data 1, 2. For example, the decoder 13 may instruct which data is to be selected by a signal "00", "01" or "10", for example. Further, the address data must also be adapted to specify either of the replacement data 1 or 2 to select the selector 12 to be replaced.

The number of replacement data may be equal to three or more such that three or more selectors 12 can be specified to substitute the replacement data for the setting data. Furthermore, the embodiment of FIG. 3 may be adapted to provide a plurality of replacement data as in the embodiment of FIG. 4.

The data processed by the digital signal processing unit 10 is not limited to image data, but may be voice data that is obtained by converting voice signals into digital data using a similar procedure.

According to the present invention, the computation condition can be partially changed without rewriting of the setting data used to set the computation condition. Therefore, any circuit for writing the setting data can be omitted. This can simplify the peripheral circuit externally attached to the signal processing apparatus if it is formed as an integrated circuit. When such a signal processing apparatus is mounted in a camera, its manufacturing cost can be reduced.

We claim:

1. A signal processing apparatus for performing plural computations under a set condition, said signal processing apparatus comprising:

a digital signal processing unit for performing plural computations on digital input data to form digital output data, the computations performed by said digital signal processing unit being controlled by the state of a plurality of setting data;

a register for storing the plurality of setting data and for providing the plurality of setting data to said digital signal processing unit;

a replacement data input unit for inputting replacement data; and a replacement unit for temporarily substituting the replacement data for part of the plurality of setting data received from said register, the replacement data being provided to said digital signal processing unit by said replacement unit, wherein the setting data is control data for the digital signal processing unit and is different from the distal input data.

2. The signal processing apparatus as defined in claim 1, wherein said replacement unit comprises a plurality of selectors, each of said plurality of selectors being operative to receive one of the plurality of setting data from said register and at least one replacement data from said replacement data input unit and to select one of said setting data and said replacement data, said selected one data being supplied to said digital signal processing unit.

3. The signal processing apparatus as defined in claim 2, further comprising an address data input unit for inputting address data that is used to specify which of said plurality of selectors is to select the replacement data, said selector being controlled by the inputted address data.

4. The signal processing apparatus as defined in claim 1, wherein said register is a serial register for receiving the plurality of setting data serially transferred thereto.

5. The signal processing apparatus as defined in claim 1, wherein said register is a nonvolatile memory for storing the plurality of setting data.

6. A signal processing apparatus for performing computations on digital input data, said signal processing apparatus comprising:

a digital signal processor performing computations on the digital input data to produce digital output data, the digital signal processor having a plurality of control setting inputs for receiving control data;

a register storing a plurality of setting data; and a plurality of selectors, each of the selectors receiving one of the plurality of setting data from the register and at least one replacement data, wherein the operation of the digital signal processor is controlled by the control data that is received at the control setting inputs, and each selector selects one of the received setting data and replacement data, and supplies the selected data to one of the control setting inputs of the digital signal processing unit as part of the control data, the replacement data being substituted for part of the plurality of setting data stored in the register when the replacement data is selected by one of the selectors.

* * * * *